United States Patent Office 2,918,086
Patented Dec. 22, 1959

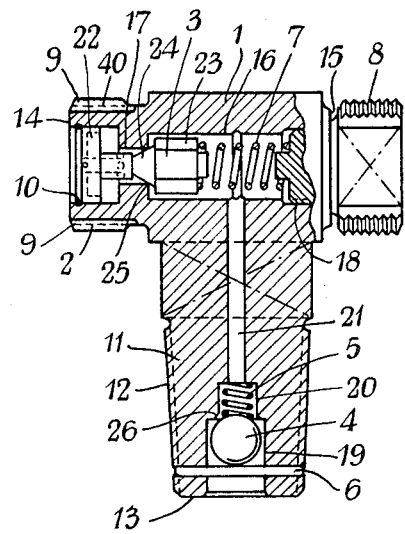
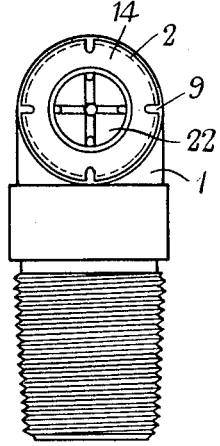
Fig. 1.    Fig. 2.
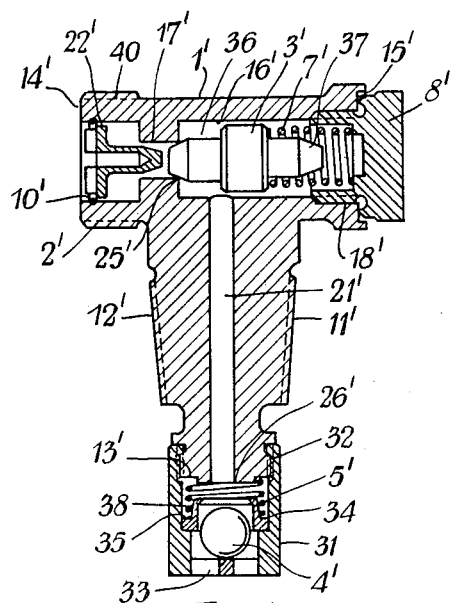
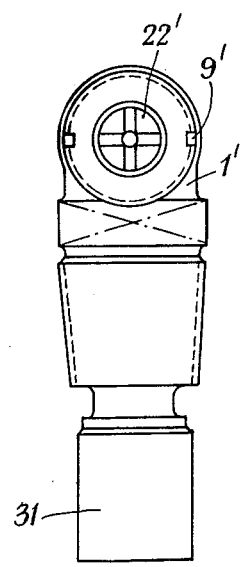
Fig. 3.    Fig. 4.

2,918,086

VALVE DEVICES

Hans Eich, Weiss, Germany, assignor to Maschinenfabrik Surth Zweigniederlassung der Gesellschaft für Linde's Eismaschinen Aktiengesellschaft, Surth, near Cologne, Germany Application May 11, 1955, Serial No. 507,658
In Germany October 18, 1948

Public Law 619, August 23, 1954
Patent expires October 18, 1968

7 Claims. (Cl. 137—613)

This invention relates to coupling devices and is more particularly concerned with coupling devices of the kind used for connecting gas containers such as oxygen bottles to pipes, reducing valves or the like.

Known devices of this kind comprising valves having glands and screw-threaded spindles lose a slight amount of their tight seal at the gland, with the result that considerable gas losses occur. To prevent such losses, the glands are sealed. Since, in oxygen valves, the valve spindle cannot be greased because of the risk of a burnout, these known devices may become so hard to actuate after sealing that the conventional hand-wheels are inadequate and hand-wheel enlargers have to be used.

These difficulties have been overcome at low pressures, for example in the case of compressed air closure valves, by replacing the conventional globe valves by automatic closure members which automatically open when piping is connected thereto and re-close when the piping is detached. However, it has been found that, at high pressures, for example at pressures of 150 atmospheres absolute, the stressing of the connecting screw-threads becomes so great that it becomes impossible to connect the gas supply device without considerable losses of gas occurring.

It is an object of the invention to provide a new and improved coupling device for connecting a gas container to a pipe, reducing valve or the like for the supply of gas at high pressure without great losses of gas.

According to the present invention there is provided a substantially pressure free fluid coupling device of the type that when uncoupled fluid flow therethrough is blocked and upon coupling action unblocking occurs, comprising a housing, first and second wall portions of said housing defining respectively first and second channels within said housing, said channels communicating with each other, a first end-face of said housing defining a mouth of said first channel, a second end-face of said housing defining a mouth of said second channel, screw-threads on said first wall portion adjacent said first end face, screw-threads on said second wall portion adjacent said second end-face, a first valve means in said first channel and disposed adjacent said first mentioned mouth, first biassing means for biassing said first valve means into a closed position for closing said first channel, said first valve means being so disposed as to be displaceable into an open position for opening said first channel upon an at least partial coupling action involving said first wall portion, a second valve means in said second channel and disposed adjacent said second mentioned mouth, second biassing means for biassing said second valve means into an open position for opening said second channel, said second valve means being displaceable into a closed position for substantially closing said second channel whilst allowing for a minimal fluid leakage therethrough when subjected to fluid pressure acting in a direction opposed to said biassing means and when said fluid pressure is greater than an oppositely directed gas pressure in said housing taken together with the biassing force of said second biassing means, and communicating means for establishing a flow path between the first channel and a point on the outer surface of said first wall portion beyond the utilised extent of said screw-threads on the first wall portion, said flow path being established upon a partial coupling action so as rapidly to vent said first channel and being sealed upon a full coupling.

For a better understanding of the invention and to show how the same may be carried into effect, reference will now be made to the accompanying drawings, in which:

Figure 1 is a side-elevation, mainly in section, of one constructional form of a coupling device, Figure 2 is an end-elevation corresponding to Figure 1, Figure 3 is a side-elevation mainly in section of another constructional form of coupling device, and Figure 4 is an end-elevation corresponding to Figure 3.

Referring firstly to Figures 1 and 2, these show a coupling device having an L-shaped housing 1 which is shown in an inverted position. A lower half 11 of the housing 1 has a slight taper towards its lower end 13 and is provided with external screw-threads 12 for screwing into a tapped conical aperture in a gas container (not shown). A projecting portion 2 of the head of the device is provided with external screw-threads 40 over most of its length. Vent grooves 9 equally spaced around the periphery of the portion 2 and disposed parallel to the axis of the head are formed in the surface of the projecting portion 2 and extend from a flat end-face 14 of the head to a location on said surface immediately beyond the utilised extent of the screw-threads 40. The head of the housing 1 is centrally bored from one end-face 14 to an opposite end-face 15 by means of a cylindrical bore 16 of substantially uniform cross-section having a short constriction 17 within the projecting end portion 2 adjacent its junction with the remainder of the housing 1. An externally threaded closure plug 8 is fitted into the mouth 18 of the bore 16 in the opposite end portion 15 of the head.

The tapered lower portion 11 of the housing 1 is centrally bored by means of a bore comprising a lower cylindrical channel 19 extending from the end face 13 of said lower portion 11 to an intermediate cylindrical channel 20, shorter and narrower than the lower channel 19 which intermediate channel 20 communicates with the bore 16 in the head by means of a narrow upper channel 21.

A grooved and bored cruciform pressure-member 22 is housed within the projecting portion 2 of the head and the ends of this pressure-member 22 are in slidable contact with the inside walls of the bore. A retaining ring 10 is fixed to these walls outwardly of the pressure-member 22 and immediately adjacent the end of the bore 16 so that the pressure-member 22 may only move a short distance between this ring 10 and the constriction 17. A spindle 3 is housed within the bore 16 on the opposite side of this constriction 17 adjacent the latter and bears against the pressure-member 22 through the constriction. This spindle 3 comprises a solid inner core 23 which is mainly of octagonal cross-section but ends in a short cone 24 in contact with the corner 25 formed by the adjacent surfaces of the constriction 17 and bearing against an extension secured to the pressure chamber 22. Finally, a compression spring 7 is retained between the closure plug 8 and the adjacent end-face of the spindle 3.

A solid spherical ball 4, generally of metal, is housed within said cylindrical channel 19 without touching the side-walls of the channel 19. A pin 6 extends through the lower end of the tapered housing 11 immediately below the ball 4 and limits the downward movement of the ball 4. A compression spring 5 is maintained between the ball 4 and the upper walls of the cylindrical channel 20 and said latter channel 19 so as to bias the ball 4 away from a seating 26 constituted by the adjacent rim of the channel 21. The ball 4 and the seating 26 constitute a valve. The seating 26 is provided with a rough finish so that even when the ball 4 is firmly pressed against the seating 26 said valve is not absolutely fluid-tight.

The coupling device of Figures 3 and 4 differs from that of Figures 1 and 2 mainly in that it comprises a secondary housing 31 in addition to a main T-shaped housing 1' which latter is mainly similar to the L-shaped housing 1 of Figures 1 and 2. The secondary housing 31 is in the shape of an inverted cylindrical cap with extended walls internally threaded at their upper end and screwed onto the end of the lower half 11' of the main housing. The pin 6 is omitted in this case and the ball 4' is housed in the secondary housing 31 and maintained therein by the head of the cap which is bored for gas flow. A cylindrical cap-like annulus 34 is interposed between the spring 5' and the ball 4'. The walls of the annulus partially enclose this ball 4' and their lower edge 35 is turned outwardly to form an abutting surface for the spring 5' which presses at its other end against the lower end-face of the main housing 1'. The upper rim 38 of the cap-like annulus 34 is bent over inwardly so that its inner diameter is smaller than the diameter of the ball 4'. When the ball 4' is displaced from the illustrated position upwards towards the valve seat 26' the rim 38 bears on the ball 4' and thus the annulus 34 is entrained and the spring 5' is compressed.

In addition, the spindle 3 is replaced by a larger spindle 3' comprising a mainly cylindrical core having shorter conical extensions 36 and 37 at each end and a short substantially cylindrical annulus mounted on a middle portion of the cylindrical part of the core.

The operation of the two coupling devices just described takes place along similar lines and will now be described with reference to the form illustrated in Figures 1 and 2.

When it is desired to use the coupling device for connecting a gas container to, for example, a delivery pipe, the screw-thread 12 of the coupling is screwed into a correspondingly threaded aperture in the container. The first valve means constituted by the conical portion 24 and its seating 25 is firmly closed as a result of the biassing effect of the spring 7. In view, however, of the fact that, as indicated above, the valve seating 26 is roughly finished the second valve means constituted by the ball 4 and the seating 26 is not closed in an absolutely fluid tight condition and in consequence a certain amount of leakage takes place from the gas container into the channel 21 and the bore 16. In view of this leakage the pressure in the channel 21 and the bore 16 rises and when this pressure has risen to a predetermined level the combined effect of this pressure together with the biassing effect of the spring 5 will displace the ball 4 from its seating and the channel 21 and the bore 16 will therefore be placed in communication with the interior of the containers. The delivery pipe which is provided with a shut-off valve maintained in a closed condition is then connected by means of an internally threaded connecting piece to the screw-threads 40 of the projecting portion 2. As soon as an appreciable screwing on of the connecting piece onto the projecting portion has taken place (when one or two pitches of the screw-thread 40 have been engaged by the connecting piece) a pressure member in the connecting piece bears against the cruciform pressure member 22 and axially displaces the pressure member 22 thereby displacing the conical portion 24 from off its seating 25. The first valve means will thereupon be opened and communication will be established between the channel 21 and bore 16 and the atmosphere via the vent grooves 9. This results in the rapid venting of the channel 21 and bore 16 with a consequent rapid drop in pressure in the channel 21 and bore 16. As a result of this drop in pressure a strong flow of gas takes place from the container through the open second valve means into the channel 21. However, as a result of this strong flow of gas the ball 4 will be replaced on to its seating 26 and the second valve means will be closed a very short time after the venting of the channel 21 and bore 16.

When the coupling between the coupling device and the pipe by means of the connecting means is completed that is when the connecting piece is tightly screwed against the adjacent face 14 of the coupling device, the vent grooves 9 are sealed by virtue of this tight engagement of the connecting means against the end face 14 and in consequence venting of the channel 21 and bore 16 ceases. In this condition a build-up of pressure soon takes place in the channel 21 and bore 16 as a result of the leakage of gas from the container through the second valve means and when this build-up of pressure has reached a required level the second valve means opens in a manner as described above and the channel 21 and bore 16 is placed in communication with the interior of the container. The shut-off valve in the pipe can then be opened and gas flows through the open second and first valve means into and through the pipe as required. It will be appreciated that the pipe and any ancillary equipment connected thereto is/are so arranged and dimensioned that the through flow of gas from the container through the coupling device into the pipe is never at such a rapid rate as to cause the ball 4 to be replaced on to its seating thereby resulting in closure of the second valve means.

When it is desired to uncouple the gas container from the delivery pipe the shut-off valve in the delivery pipe is closed and the connecting means is unscrewed from the screw-threads 40. With the commencement of the unscrewing of the connecting means the vent grooves 9 become unsealed and in consequence venting of the channel 21 and bore 16 takes place. This results in a rapid through flow of gas through the open second valve means, this through flow being so rapid as to result in the replacement of the ball 4 on its seating 26 and consequent closing of the second valve means. In this way the container is substantially sealed against any substantial escape of gas during the uncoupling process. The uncoupling of the connecting means from the screw-threads 40 can then be completed and when this is completed the pressure exerted by the coupling means on the pressure member 22 is removed and as a result the conical portion 24 is replaced onto its seating 25 and the first valve means is closed. With the closing of the first valve means pressure begins to build up in the channel 21 and bore 16 due to leakage through the second valve means with the consequential opening of the second valve means.

Should fracture of the delivery pipe take place whilst coupled to the gas container and whilst the connecting pipe shut-off valve is open the consequential atmospheric venting of the channel 21 and bore 16 will result in a very rapid through flow of gas from the container and through the second valve means with the consequential replacement of the ball 4 on its seating 26 and consequential closure of the second valve means. Thus the coupling device ensures that where such fracture of the delivery pipe takes place, escape of gas from the gas container is very rapidly and largely stopped. It will be appreciated that the continued leakage of gas through the second valve means when the latter is substantially closed does not of itself involve any appreciable danger.

The coupling devices just described have the advantage as compared with known arrangements that the stiffening of the valve spindles is avoided and the risks of burn-out and of frequent break-down are practically eliminated. These new closure valves were proved to be particularly advantageous for the filling of cylinders in an oxygen factory where every day hundreds of cylinders were simultaneously filled in batches of 25 to 50. With the known valves each valve had to be opened individually after connection of the charging pipe and reclosed individually at the end of charging operations, but individual valve actuation of this kind was eliminated by means of this novel construction. All that had to be done was to screw the charging piping on or off, and this initiated or terminated the charging operation. Not only is subsequent sealing of glands which may have lost their fluid-tightness avoided, but also considerable gains in time and labour result from the elimination of the need to screw and unscrew the valves. The new coupling device presents the further advantage that the valve spindles can be replaced under pressure. Finally, if oil-wetted connection seals are used and are set on fire, only these seals will continue to burn, for, as a result of the increased escape of gas which then occurs, the auxiliary shut-off member 4 is immediately brought into its closure position, so that any further escape of gas is prevented and the risk of a burn-out is thereby avoided.

I claim:

1. A substantially pressure free fluid coupling device of the type that when uncoupled fluid flow therethrough is blocked and upon coupling action unblocking occurs, comprising a housing, first and second wall portions of said housing defining respectively first and second channels within said housing, said channels communicating with each other, a first end-face of said housing defining a mouth of said first channel, a second end-face of said housing defining a mouth of said second channel, screw-threads on said first wall portion adjacent said first end-face, screw-threads on said second wall portion adjacent said second end-face, a first valve means in said first channel and disposed adjacent said first mentioned mouth, first biassing means for biassing said first valve means into a closed position for closing said first channel, said first valve means being so disposed as to be displaceable into an open position for opening said first channel upon an at least partial coupling action involving said first wall portion, a second valve means in said second channel and disposed adjacent said second mentioned mouth, second biassing means for biassing said second valve means into an open position for opening said second channel, said second valve means being displaceable into a closed position for substantially closing said second channel whilst allowing for a minimal fluid leakage therethrough when subjected to fluid pressure acting in a direction opposed to said biassing means and when said fluid pressure is greater than an oppositely directed gas pressure in said housing taken together with the biassing force of said second biassing means, and communicating means for establishing a flow path between the first channel and a point on the outer surface of said first wall portion beyond the utilised extent of said screw-threads on the first wall portion, said flow path being established upon a partial coupling action so as rapidly to vent said first channel and being sealed upon a full coupling.

2. A coupling device according to claim 1, wherein said communicating means is constituted by a longitudinal groove formed in the outer surface of said first wall portion, the first end opening of said groove being disposed on the periphery of said first end face.

3. A coupling device according to claim 2, and furthermore comprising a removable plug member sealing an end of said first channel opposite to said first mentioned mouth, and wherein said first biassing means comprises a coil spring, one end of which bears against said first valve means and an opposite end of which bears against an adjacent face of said plug member.

4. A coupling device according to claim 3, wherein said second wall portion comprises a removable cylindrical sleeve having a screw connection to the remainder of the housing, said second valve means being retained in said sleeve.

5. A coupling device according to claim 2, wherein said second wall portion comprises a removable cylindrical sleeve having a screw connection to the remainder of the housing, said second valve means being retained in said sleeve.

6. A coupling device according to claim 1, and furthermore comprising a removable plug member sealing an end of said first channel opposite to said first mentioned mouth, and wherein said first biassing means comprises a coil spring, one end of which bears against said first valve means and an opposite end of which bears against an adjacent face of said plug member.

7. A coupling device according to claim 1, wherein said second wall portion comprises a removable cylindrical sleeve having a screw connection to the remainder of the housing, said second valve means being retained in said sleeve.

References Cited in the file of this patent

UNITED STATES PATENTS

| | | |
|---|---|---|
| 523,391 | Wolfe | July 24, 1894 |
| 886,834 | Michelin | May 5, 1908 |
| 2,092,116 | Hansen | Sept. 7, 1937 |
| 2,367,662 | Baxter | Jan. 23, 1945 |

FOREIGN PATENTS

| | | |
|---|---|---|
| 563,920 | Germany | Oct. 27, 1932 |
| 465,264 | Great Britain | May 5, 1937 |